INVENTOR.
Albert J. Benson
BY Moody and Phillion
Attorneys

United States Patent Office 3,273,045
Patented Sept. 13, 1966

3,273,045
CIRCUIT FOR SYNCHRONIZING FIRING OF DIODES IN DIODE-CONTROLLED RECTIFIER
Albert J. Benson, Huntington Beach, Calif., assignor to Collins Radio Company, Cedar Rapids, Iowa, a corporation of Iowa
Filed July 11, 1962, Ser. No. 208,997
12 Claims. (Cl. 321—43)

This invention relates, generally, to controlled rectifier circuits and, more particularly, to a controlled rectifier for rectifying a three-phase voltage employing synchronizing signals derived from the three-phase voltage to trigger the rectifying elements of the system.

In some applications it is required that a rather large amount of D.C. power be controlled from a remote station using only a relatively small control signal. Also, it is desirable that the control means be reliable. For many purposes the use of a circuit breaker or relay type switches for controlling a D.C. power source has not proven entirely satisfactory due to lack of reliability and also to the fact that both relays and circuit breakers produce arcing both on making and breaking circuits, which arcing produces harmful transients. An additional difficulty in employing relays or circuit breakers to control a large D.C. power source from a remote station is the fact that a relatively large amount of control power is required.

Of course, most large D.C. power supplies are derived from A.C. sources, and specifically from three-phase alternating current sources.

Some of the systems deriving D.C. power by rectifying a three-phase A.C. source overcome the problems of remote control by employing controlled rectifiers which require relatively small control signals. In half wave rectification three control rectifiers usually are employed, one for each phase. In full wave rectification six control rectifiers usually are required, two for each phase.

The controlled rectifiers are fired at the proper time to allow half cycles of one potential (positive, for example,) of each of the three phases to pass therethrough, thus resulting in a D.C. output voltage. However, there are difficulties presented in prior art systems of this nature. A principal difficulty is that the control signals which fire the controlled rectifiers are not always properly synchronized with the received phases so that firing may occur at the wrong time. Another specific difficulty of prior circuits is that transients occurring in the circuit may produce false firing.

It is a primary object of the present invention to provide a reliable means for controlling the rectification of a large D.C. power supply from a three-phase A.C. source by controlled rectifier means.

It is a further object of the invention to control the switching of controlled rectifiers in a three-phase rectifier from a remote point by deriving control signals directly from the three-phase power supply to insure proper synchronizing of the control signals and the three-phase power supply.

A third aim of the invention is to provide a controlled rectifying means for rectifying a three-phase power supply, which is substantially immune to false firing from transient conditions.

In accordance with the invention, the anodes of three controlled rectifiers are respectively connected to each of the three output leads of a three-phase power supply. The cathodes of the three controlled rectifiers are connected together to form one of the output leads of the over-all rectifier system, said output lead being connected to a suitable filter to remove ripple. Each of the output leads of the three-phase A.C. source are also individually connected to the anode of an individual rectifier of a second group of three rectifiers, the cathodes of which are connected together and then to ground potential through a common resistor. Between the common cathode connection of the first group of controlled rectifiers and the common cathode connection of the second group of rectifiers, there is connected the series arrangement of the primary winding of a pulse transformer and a capacitor. Due to the presence of the capacitor, the common cathode connections of the two groups of rectifiers are isolated from each other with respect to D.C. voltage, or low frequency A.C. voltage.

Since the controlled rectifiers remain nonconductive until fired by means of a suitable control signal supplied to the firing electrode thereof, the cathode of said controlled rectifiers will remain isolated electrically from the anodes until firing of a controlled rectifier does occur. However, the second group of rectifiers are conventional diodes and the potential of the common cathode connection will follow the potential of the highest positive voltage supplied to any of the three anodes thereof. Thus, each time a phase of the three-phase A.C. signal crosses zero and starts to rise positively, the common cathode potential of the three conventional diodes will rise therewith, whereas the common cathode potential of the controlled rectifiers will not so rise until the controlled rectifier is fired. Thus, a sharply rising pulse of voltage is created across the primary of the aforementioned pulse transformer. Shaping means and amplifying means are provided to respond to this pulse generated in the transformer primary to produce an output pulse which is supplied back to the firing electrode of a selected one of the three controlled rectifiers. Only that particular controlled rectifier to which is applied the phase which is crossing the zero axis and rising positively, will fire.

The aforementioned cycle is repeated for each phase of the three-phase A.C. power supply to produce rectification of each of the three phases of the applied three-phase voltage.

A feature of the invention lies in the fact that the pulses employed to fire the controlled rectifiers are derived directly from the three-phase A.C. power supply, thus insuring that the phase relationship between the firing of the controlled rectifiers and the phases of the A.C. power supply are correct.

Another important feature of the invention lies in the fact that the anodes of the two groups of three rectifiers are both connected to the A.C. power supply. Thus, any transients occurring in the A.C. power supply (which transients will ordinarily occur in all three phases) will appear across both terminals of the pulse transformer and thus cancel out across the transformer primary, thereby producing no false firing of any of the controlled rectifiers.

The above-mentioned and other objects and features of the invention will be more fully understood from the following detailed description thereof when read in conjunction with the drawings in which.

Figure 1:
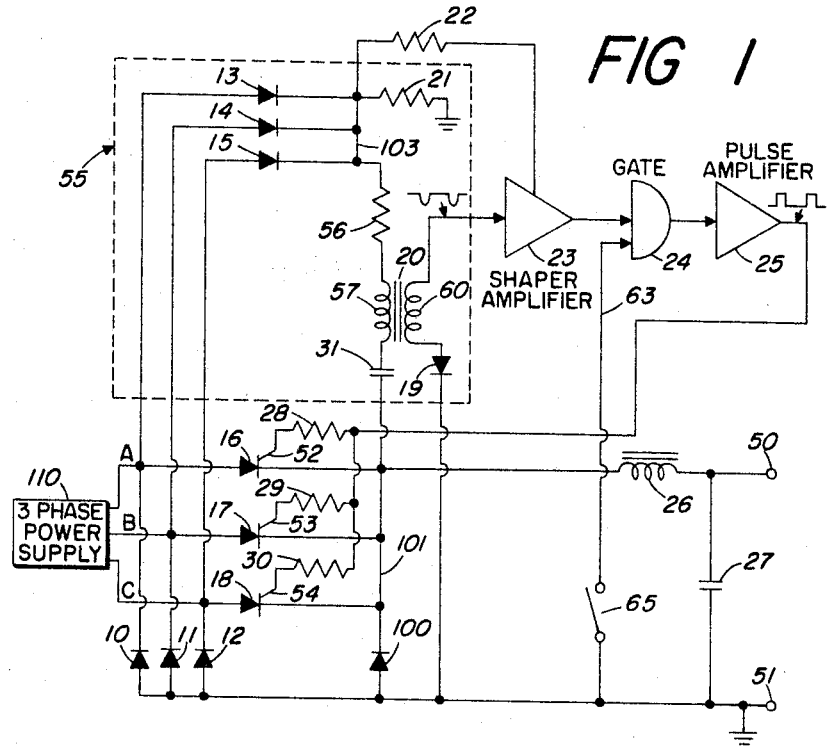
FIG. 1 shows a combination schematic and block diagram of the invention.

Referring now to FIG. 1, the three-phase A.C. power supply to be converted to D.C. voltage is represented by block 110 and has three output terminals identified by reference characters A, B, and C which are, respectively, connected to two sets of three rectifiers. One of these sets of rectifiers are controlled rectifiers 16, 17, and 18, which have their cathodes connected in common to the bus 101 which, in turn, is connected to one terminal of a filter consisting of inductor 26 and capacitor 27. The said filter functions to remove the ripple from the D.C. output voltage appearing on lead 50. Each of the controlled rectifiers 16, 17 and 18 has a control electrode identified by reference characters 52, 53, and 54, respectively. When the anode of any of the controlled rectifiers 16 through 18 is positive with respect to the cathode, said rectifier will fire upon the application of a positive pulse to the control electrode thereof. Consequently, it can be seen that if control pulses are applied to the control electrodes at the proper times, the rectifiers 16, 17, and 18 will be caused to fire in such a manner as to pass only the positive half cycles of the particular phase supplied thereto. It is these aforementioned control pulses which are supplied to the control rectifiers that are easily controllable from a remote station.

The means for deriving the aforementioned synchronized control pulses is contained within the block 55 of FIG. 1. Such synchronizing pulse deriving circuit comprises three rectifiers 13, 14, and 15 having their anodes connected to the three output terminals A, B, and C of the three-phase A.C. source 110 and having their cathodes connected in common on bus 103 which is connected to ground potential through resistor 21. Across the common cathode bus 103 and the common cathode connection 101 of rectifiers 16, 17, and 18 there is connected a circuit consisting of resistor 56, primary winding 57 of a pulse transformer 20 and a D.C. isolating capacitor 31. When a pulse is generated in pulse transformer 20, due to one of the phases of the A.C. source crossing zero and going positive, such pulse is shaped by shaper amplifier 23 and then supplied through diode gate 24 to pulse amplifier 25. From the pulse amplifier 25 the pulse, which is now reformed and delayed slightly for purposes to be discussed later herein, is supplied back to the control electrodes 52, 53, and 54 of the controlled rectifiers 16 through 18 through resistors 28, 29, and 30, respectively. The resistors 28, 29, and 30 are current limiting resistors.

Figure 2:
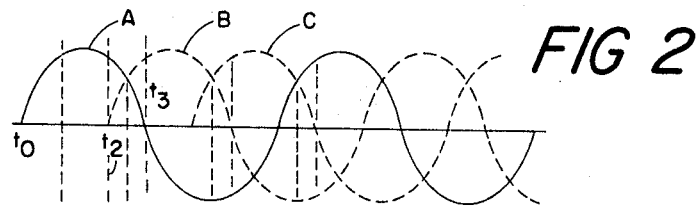
FIGS. 2 through 6 show waveforms of the applied A.C. power supply and the control signals generated within the circuit.

Each of such control pulses will function to fire only one of the rectifiers 16, 17, or 18, even though each control pulse is applied to all three control electrodes. The aforementioned can be more readily understood from a consideration of the waveforms of FIGS. 2 through 6. In FIG. 2 there is shown the three phases A, B, and C representing the signals appearing on the output terminals A, B, and C of the A.C. source 110 of FIG. 1. Assume at time $t_0$ that the phase A which has just crossed the zero line is going positive so that the potential of the anodes of diodes 16 and 13 also will go positive. The potential of the cathodes of diodes 13, 14, and 15 will follow the potential of the anode of diode 13 in the positive direction since the diodes are of conventional type. However, the potential of the common cathode bus 101 of rectifiers 16, 17 and 18 will not immediately follow the anodes thereof positive, since rectifiers 16, 17, and 18 have not yet fired. Consequently, a voltage will be created across the busses 103 and 101, which has a sharply rising edge in accordance with the rising potential of the waveform A of FIG. 2 at time $t_0$. Such rising voltage will produce a current pulse in the secondary winding 60 of the pulse transformer 20. Such induced pulse, which is represented by the pulse 61 in the curve of FIG. 3, appears on the input lead of shaper amplifier 23 and is negative due to the presence of the diode 19 which functions to ground the positive portions thereof. Such negative pulse 61 is shaped by the shaper amplifier 23 to produce the pulse 40 shown in FIG. 4. The output pulse 40 from shaper amplifier 23 is then suppled to one of the two input leads of gate 24. More specifically, unless the input lead 63 is open, there can be no output signal from the gate 24. When ground potential is supplied to the lead 63 the diode gate 24 will not produce an output signal. The switch 65 is employed to supply such a ground and may be located at the remote station mentioned hereinbefore.

The output signal of the gate 24 is supplied to a pulse amplifier 25 which performs two functions. The first function is to differentiate the pulse supplied thereto to produce two output pulses; one produced by, and coincident with, the leading edge of the applied pulse and a second pulse produced by, and coincident with, the trailing edge of the applied pulse. The pulse produced by the leading edge of the applied signal is discarded by suitable means. However, the pulse produced from the trailing edge of the applied input pulse is amplified and shaped by the pulse amplifier 25 to produce the pulse 68 of FIG. 5, which pulse can be seen to be delayed with respect to the pulse 40 of FIG. 4. The output pulse 68 from the pulse amplifier 25 is supplied back to the control electrodes of diodes 16, 17, and 18 to cause firing only of the control rectifier 16 for reasons set forth below. Thus, at time $t_1$ the potential of the common bus 101 rises from zero potential to the potential of the applied signal of phase A, as shown in FIG. 6.

Up to this point we have been discussing the operation of the circuit from an initial condition of complete de-energization. Thus, a pulse was generated in the pulse transformer 20 as soon as the phase A signal crossed the zero line at time $t_0$ and began to rise a positive direction. At time $t_2$, however, when the phase B signal crosses the zero line and begins to rise positively, the pulse transformer 20 will not immediately generate a pulse. The reason for this is that at time $t_2$ the potential of the bus 103 is positive, as determined by the potential of the phase A signal, and this positive potential is greater than the positive potential of the phase B signal at time $t_2$. Consequently, the phase B signal cannot raise the potential of the bus 103 at this time $t_2$. However, at time $t_3$ the potential of the phase B signal passes that of the phase A signal and will raise the potential of the bus 103. Also, at time $t_3$, the potential of the bus 101 is still decreasing, as can be seen from FIG. 2, since the potential of the bus 101 must necessarily follow the potential of the phase A signal (only controlled rectifier 16 being fired). Consequently, there is produced across the pulse transformer 20 a voltage pulse which results in the generation of the pulse 43 of FIG. 3 in the secondary winding thereof. The pulse 43 is shaped in shaper amplifier 23 to produce a pulse 69 of FIG. 4 which, in turn, is processed by the pulse amplifier 25 in a manner described hereinbefore to produce the delayed pulse 42 of FIG. 5. The pulse 42 is applied back to the control electrodes of the controlled rectifiers 16, 17, and 18 at time $t_3$ to fire only the rectifier 17, since the rectifier 17 is the only one of rectifiers 16, 17, and 18 whose anode is more positive than its cathode, as can be seen from examination of FIGS. 2 and 6.

Figure 3:

In a similar manner the rectifier 18 is fired as the result of the generation of the pulse 70 of FIG. 3 in the pulse transformer 20 of FIG. 1.

Figure 4:
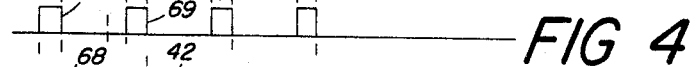
Figure 5:
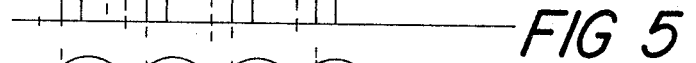
Figure 6:

It will be noted from an examination of FIGS. 4 and 6 that the amplitude of the D.C. output signal can be controlled by controlling the width of the pulses of FIG. 4. Such width control can be accomplished by conventional circuit means which can be incorporated with shaper amplifier 23. For example, if pulse 69 were made wider so that the trailing edge occurred later, the pulse 42 would not be generated until a later time. Consequently, the firing of the rectifier 17 would not occur until a time later than $t_3$. In the absence of the capacitor 31, the D.C. voltage built up on the output lead 50 would be impressed upon the common bus 103 through the primary winding 57 of pulse transformer 20 and resistor 56. In order to insure that an excessive potential is not built up across the D.C. blocking capacitor 31, a discharge path is supplied therefor through the resistor 21 to ground.

The diodes 10, 11, and 12 function to ground the negative excursions of each of the phase signals in a conventional manner. The diode 100 functions to insure that the last conductive diode will cut off when the switch 65 is opened. It can be seen that in the absence of such a diode 100, if the switch 65 were closed at a time when the current on the bus bar 103 were decreasing, the inductance of the circuit would tend to decrease the potential of both plates of capacitor 31, thus decreasing the potential of the bus 101 and maintaining one or more of the controlled rectifiers 16, 17, or 18 in a conductive state. Through the use of the diode 100 the potential of the bus bar 101 can never decrease below ground potential (ignoring any small potential drop across the diode 100).

As discussed hereinbefore, the switch 65 may be located at some remote point. There is very little current flowing through the switch 65 since it merely provides ground potential to the input lead 63 of the gate 24, thus disabling the gate to stop a pulse supplied thereto from shaper amplifier 23.

It is to be noted that the form of the invention shown and described herein is but a preferred embodiment thereof and that various changes may be made in circuit arrangement without departing from the spirit or scope of the invention. For example, the principles outlined herein could also be applied to single phase or six phase A.C. sources.

I claim:

1. Rectifying means for rectifying a three-phase signal source having an output terminal for each phase, comprising three controlled rectifier means each including a first anode, a first cathode and a control electrode, individual ones of said anodes being connected to an individual one of said three output terminals of said three-phase signal source, said cathodes having a first common terminal, three unilateral impedance means, each having anode means and cathode means, said unilateral impedance anode means being individually connected to individual ones of said three output terminals, said unilateral impedance cathode means having a second common terminal, pulse forming means responsive to sudden changes in potential between said first and second common terminals to produce corresponding output pulses, means for supplying said output pulses to the said control electrodes of said three controlled rectifiers to fire the particular rectifier whose anode potential is then greater than its cathode potential.

2. Rectifying means in accordance with claim 1 in which said pulse forming means comprises means for controlling the interval of time elapsing between a sudden change of potential between said first and second common terminals and the generation of a resultant output of pulse to thereby control the firing time of said controlled rectifiers.

3. Rectifying means in accordance with claim 2 in which said pulse forming means comprises gating means having an input control terminal and constructed and arranged to control the production of pulses from said pulse forming means in response to a control signal supplied to said input control terminal.

4. Rectifying means in accordance with claim 1 in which said pulse forming means comprises capacitive means and pulse transformer means having a primary winding connected in series arrangement with said capacitive means between said first and second common terminals.

5. Rectifying means in accordance with claim 4 in which said pulse forming means comprises means for controlling the interval of time elapsing between a sudden change of potential between said first and second common terminals and the generation of a resultant output of pulse to thereby control the firing time of said electron valve means.

6. Rectifying means in accordance with claim 5 in which said pulse forming means comprises gating means having an input control terminal and constructed and arranged to control the production of pulses from said pulse forming means in response to a control signal supplied to said input control terminal.

7. Rectifying means for rectifying a three-phase signal source having an output terminal for each phase, comprising three electron valve means each including electron emitting means, electron collecting means, and electron control means, individual ones of said electron collecting means being connected to an individual one of said three output terminals of said three-phase signal source, said electron emitting means having a first common terminal, three unilateral impedance means, each having anode means and cathode means, said unilateral impedance anode means being individually connected to individual ones of said three output terminals, said unilateral impedance cathode means having a second common terminal, pulse forming means responsive to sudden changes in potential between said first and second common terminals to produce corresponding output pulses, means for supplying said output pulses to the electron control electrodes of said three electron valve means to fire the particular valve means whose electron collector electrode potential is then greater than its electron emitter electrode potential.

8. Rectifying means in accordance with claim 7 in which said pulse forming means comprises means for controlling the interval of time elapsing between a sudden change of potential between said first and second common terminals and the generation of a resultant output of pulse to thereby control the firing time of said electron valve means.

9. Rectifying means in accordance with claim 8 in which said pulse forming means comprises gating means having an input control terminal and constructed and arranged to control the production of pulses from said pulse forming means in response to a control signal supplied to said input control terminal.

10. Rectifying means in accordance with claim 7 in which said pulse forming means comprises capacitive means and pulse transformer means having a primary winding connected in series arrangement with said capacitive means between said first and second common terminals.

11. Rectifying means in accordance with claim 10 in which said pulse forming means comprises means for controlling the interval of time elapsing between a sudden change of potential between said first and second common terminals and the generation of a resultant output of pulse to thereby control the firing time of said electron valve means.

12. Rectifying means in accordance with claim 11 in which said pulse forming means comprises gating means having an input control terminal and constructed and arranged to control the production of pulses from said pulse forming means in response to a control signal supplied to said input control terminal.

References Cited by the Examiner

UNITED STATES PATENTS 2,986,692  5/1961  Fischer _____ 321—40

OTHER REFERENCES

"Marconi Review," vol. XXV, No. 144, first quarter 1962 (pp. 79–87).

JOHN F. COUCH, *Primary Examiner.*

LLOYD McCOLLUM, *Examiner.*

A. J. GAJARSA, M. WACHTELL, *Assistant Examiners.*